United States Patent [19]

Saitoh et al.

[11] Patent Number: 5,949,381
[45] Date of Patent: *Sep. 7, 1999

[54] ON-VEHICLE WINDOWPANE ANTENNA APPARATUS

[75] Inventors: Masatoshi Saitoh, Machida; Hiroyuki Tachihara, Inzai, both of Japan

[73] Assignee: Harada Industry Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/851,887

[22] Filed: May 6, 1997

[30] Foreign Application Priority Data

May 8, 1996 [JP] Japan ..................................... 8-113844

[51] Int. Cl.$^6$ ....................................................... H01Q 1/32
[52] U.S. Cl. ................................................................ 343/713
[58] Field of Search ................................... 343/713, 741, 343/895, 754, 700 MS; H01Q 1/32

[56] References Cited

U.S. PATENT DOCUMENTS 3,906,514  9/1975  Phelan ...................................... 343/895
3,956,752  5/1976  Phelan et al. ............................ 343/754
5,079,560  1/1992  Sakurai et al. .......................... 343/713
5,526,007  6/1996  Murakami et al. ...................... 343/741
5,581,264  12/1996  Tabata et al. ........................... 343/713
5,659,324  8/1997  Taniguchi et al. ...................... 343/713

*Primary Examiner*—Don Wong
*Assistant Examiner*—Hoang Nguyen
*Attorney, Agent, or Firm*—John P. White; Cooper & Dunham LLP

[57] ABSTRACT

A on-vehicle windowpane antenna apparatus according to the present invention is mounted on a windowpane of a vehicle. The apparatus includes a rectangular loop formed of a first long and narrow conductor, and a composite line formed of a second long and narrow conductor arranged in parallel with one of short sides of the rectangular loop. The apparatus also includes means for causing the apparatus to serve as a circularly polarized antenna which emits a circularly polarized wave in a direction perpendicular to a plane where the rectangular loop including the composite line is formed, and which is capable or receiving a GPS wave.

2 Claims, 12 Drawing Sheets

$Lx1 = 0.3437 \lambda 0$, $Ly = 0.2219 \lambda 0$
$Lx2 = 0.2800 \lambda 0$, $a = 0.002 \lambda 0$

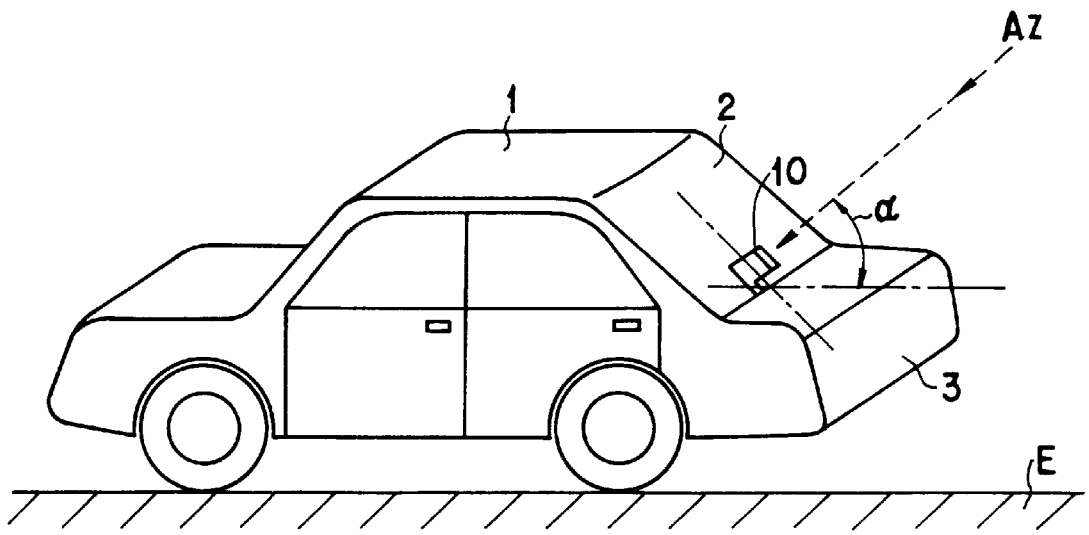
F I G. 1
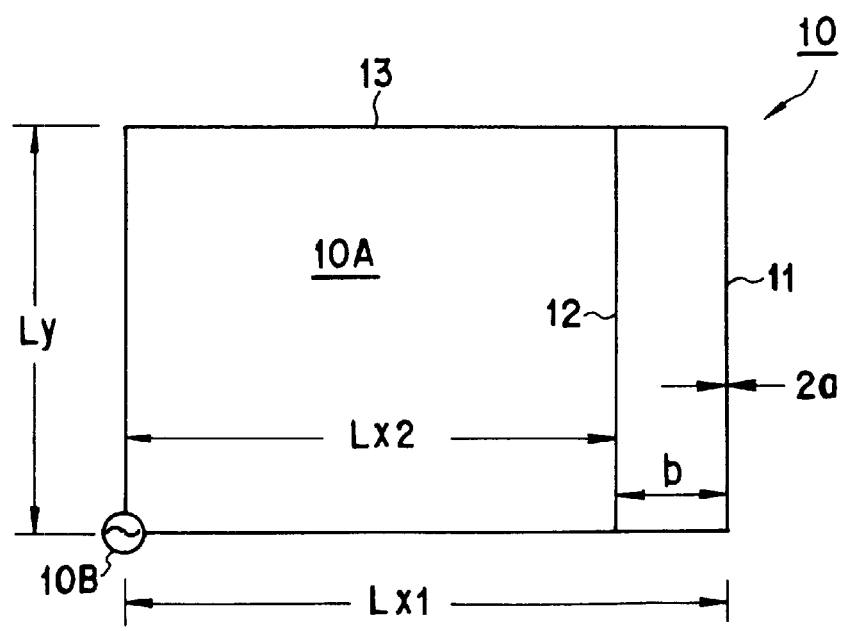
$Lx1 = 0.3437 \lambda 0$, $Ly = 0.2219 \lambda 0$
$Lx2 = 0.2800 \lambda 0$, $a = 0.002 \lambda 0$
F I G. 2

$$\eta s = \frac{Lb}{La} = \frac{1}{\sqrt{\epsilon re}}$$

$Lx1 = 0.325\lambda$
$Lx2 = 0.232\lambda$
$Ly = 0.18\lambda$
$h = 0.1\lambda$
$Lf = 0.09\lambda$
$Lxf = 0.01\lambda$
$Lw = 0.1\lambda$
$Xs = 0.0\lambda$ $G0 = 2.37$ (dBi)
$G1 = -0.47$
$G2 = -3.50$
$G3 = -2.84$
$G4 = -1.30$ $Zin = 55 - j151\ (\Omega)$ $Lx1 = 0.334\lambda$
$Lx2 = 0.21\lambda$
$Ly = 0.22\lambda$
$h = 0.1\lambda$
$Lf = 0.09\lambda$
$Lxf = 0.01\lambda$
$Lw = 1.0\lambda$
$Xs = 0.0$

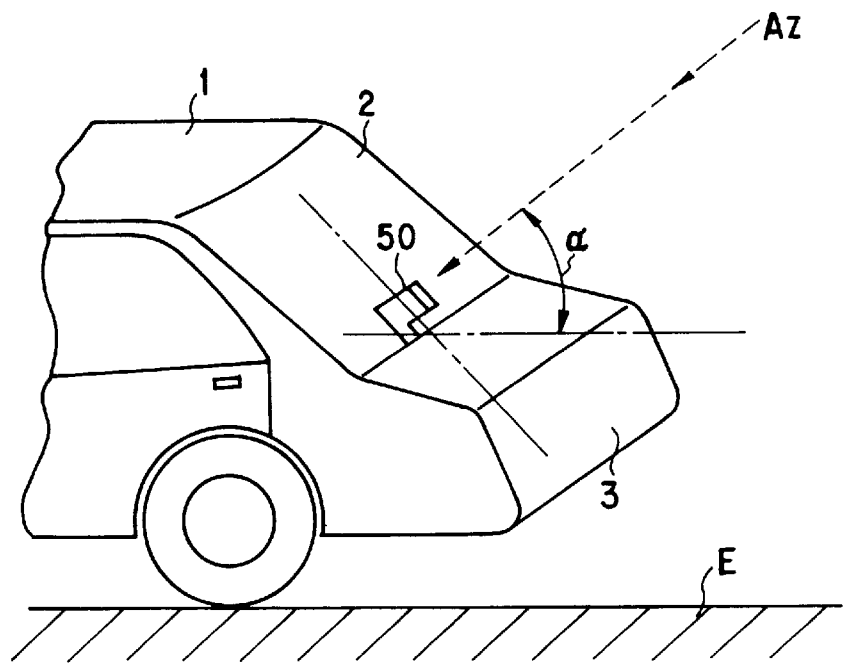
F I G. 24
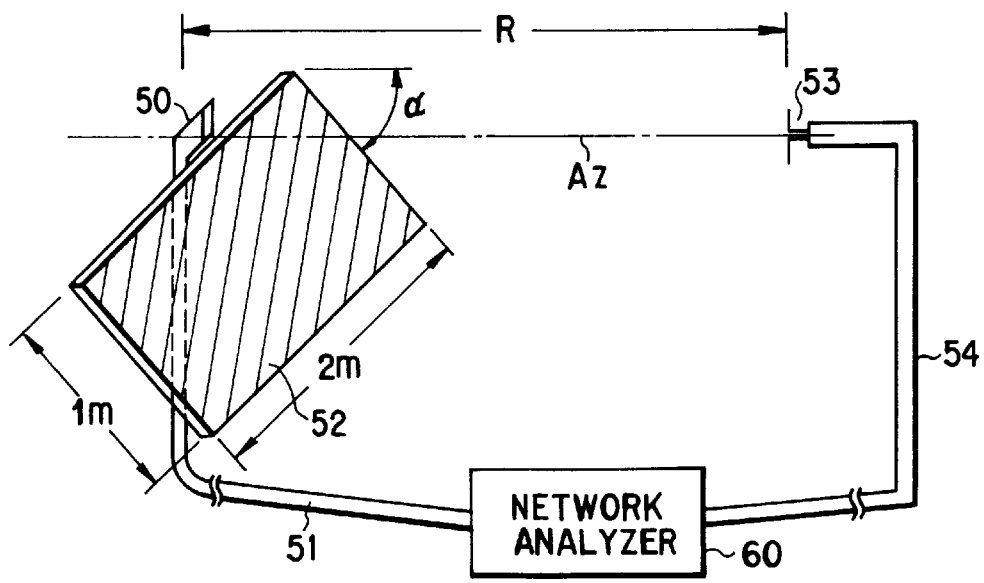
F I G. 25

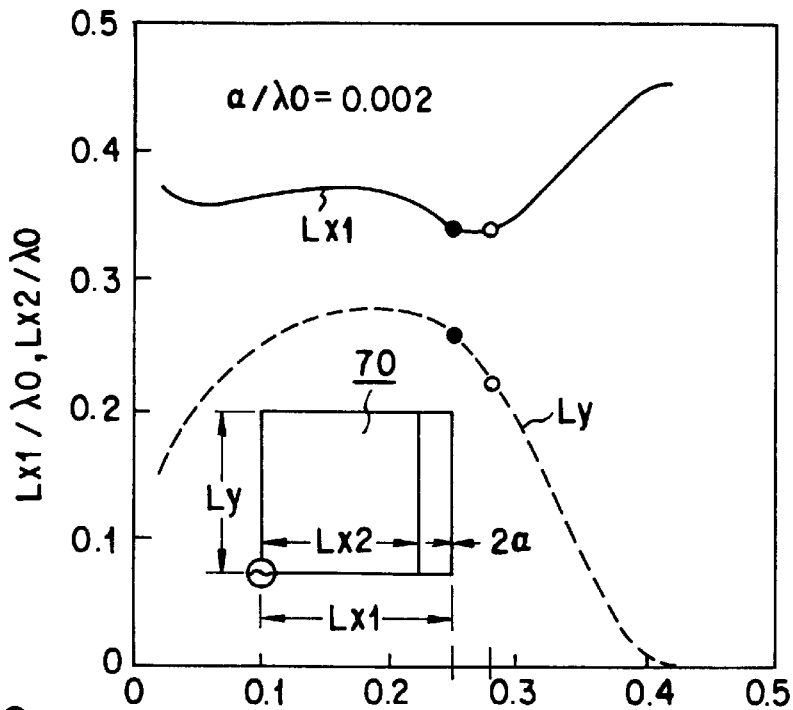
F I G. 26
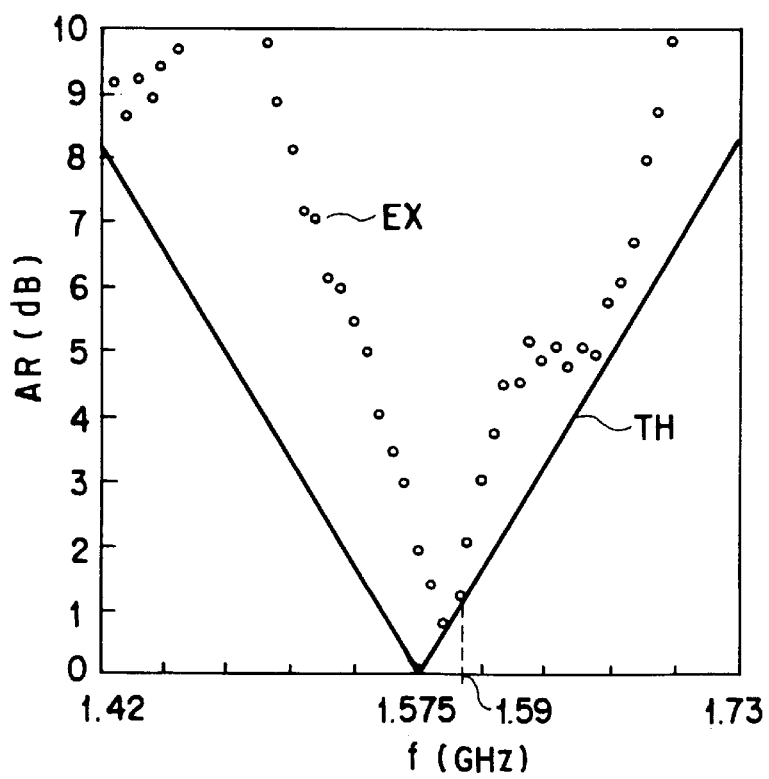
F I G. 27

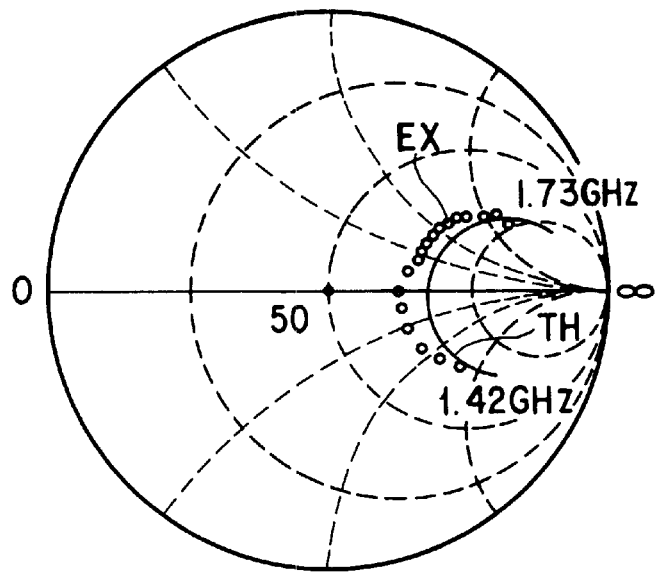
F I G. 28
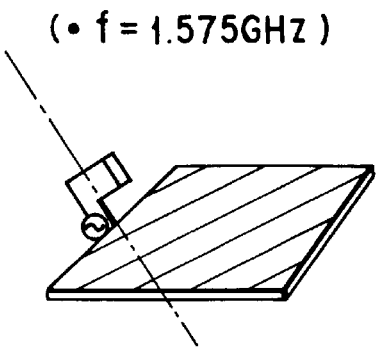
F I G. 29
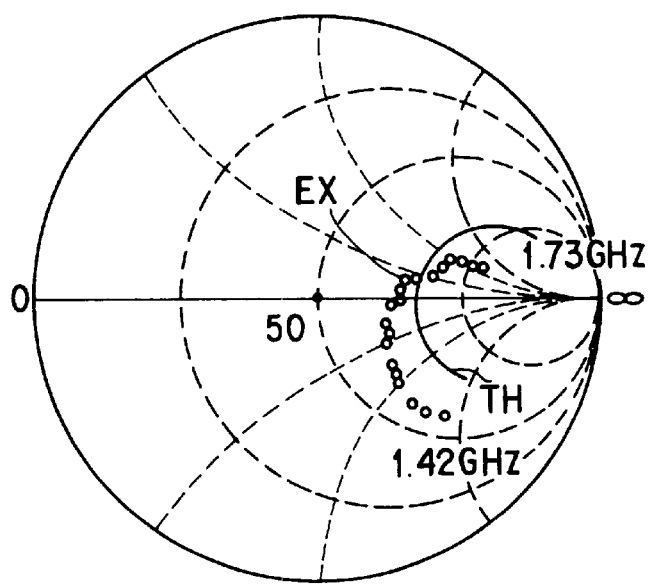
F I G. 30
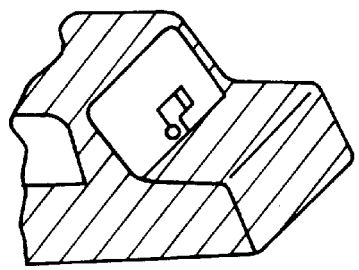
F I G. 31

5,949,381

ON-VEHICLE WINDOWPANE ANTENNA APPARATUS

BACKGROUND OF THE INVENTION

The present invention relates to an on-vehicle windowpane antenna apparatus having an antenna pattern favorable for reception of GPS (Global Positioning System) waves. This apparatus includes an antenna wherein an antenna pattern is stuck directly onto the windowpane and an antenna wherein an antenna pattern is stuck onto a transparent film and the transparent film is stuck onto the windowpane.

Various types of on-vehicle antenna apparatuses have been developed and put to practical use in order to receive AM (Amplitude Modulation) broadcast waves, FM (Frequency Modulation) broadcast waves, TV broadcast waves, etc. and to transmit/receive radio telephone waves, GPS waves, etc. Of these apparatuses, an on-vehicle windowpane antenna apparatus has recently been noticed in that a space for mounting an antenna is small, the mounting state of the antenna is unlikely to remarkably degrade the appearance of a vehicle, and no measures need be taken against a whistling sound due to the antenna. However, such an on-vehicle windowpane antenna apparatus is developing, and an on-vehicle windowpane antenna apparatus capable of receiving GPS waves has not yet been put to practical use.

Most of windowpane antenna apparatuses, which have been put to practical use, were experimentally manufactured and designed, not on the basis of an established theory. This appears to be due to great difficulties in analyzing an antenna pattern on a dielectric layer of glass.

BRIEF SUMMARY OF THE INVENTION

An object of the present invention is to provide an on-vehicle windowpane antenna apparatus having a novel antenna pattern capable of satisfactorily receiving a GPS wave. Another object thereof is to provide an on-vehicle windowpane antenna which can be stably and exactly manufactured and receive a GPS wave.

In order to achieve the above objects, an on-vehicle windowpane antenna apparatus according to the present invention has the following constructions:

(1) The antenna apparatus includes a rectangular loop formed of a first long and narrow conductor, a composite line formed of a second long and narrow conductor arranged in parallel with one of short sides of the rectangular loop, and means for causing the antenna apparatus to serve as a circularly polarized antenna which emits a circularly polarized wave in a direction perpendicular to a plane where the rectangular loop including the composite line is formed, and which is capable of receiving a GPS wave.

(2) In the apparatus described in above (1), the circularly polarized wave is a right-handed circularly polarized wave.

(3) In the apparatus described in above (1), the circularly polarized antenna is spaced by λ/4 from a window frame when λ represents a wavelength of a center frequency of the GPS wave.

(4) In the apparatus described in above (1), the circularly polarized antenna has a short side whose length ranges from 0.14λ to 0.22λ when λ represents a wavelength of a center frequency of the GPS wave.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention FIGS. 1 and 2 are views of the constitution of an on-vehicle windowpane antenna apparatus according to a first embodiment of the present invention, and FIG. 1 shows the antenna apparatus mounted on an automobile, while FIG. 2 schematically shows a pattern of a basic antenna ($P_0$ antenna) for receiving GPS waves;

FIG. 3 shows angular characteristics of the directivity of the antenna, while FIG. 4 shows frequency characteristics of the axial ratio thereof;

FIG. 5 shows frequency characteristics of input impedance, while FIG. 6 shows frequency characteristics of gain;

FIG. 12 shows the antenna apparatus seen from inside an automobile, while FIG. 13 shows an equivalent circuit for the antenna apparatus;

FIG. 14 shows the constitution of an F1 antenna when Ly is 0.14 λ, FIG. 15 shows the directivity of the antenna, and FIG. 16 shows gain characteristics;

FIG. 17 shows the constitution of an F2 antenna when Ly is 0.18 λ and FIG. 18 shows the directivity of the antenna;

FIG. 19 shows the constitution of an F3 antenna when Ly is 0.22 λ and FIG. 20 shows the directivity of the antenna;

FIG. 21 shows the constitution of an F4 antenna when Ly is 0.26 λ and FIG. 22 shows the directivity of the antenna;

FIGS. 24 and 25 are illustrations of a test on the axial ratio and input impedance of the on-vehicle windowpane antenna apparatus according to the embodiments of the present invention, and FIG. 24 shows an automobile, a GPS incoming wave, a circularly polarized antenna, and a reference coordinate of the directivity of the antenna, while FIG. 25 shows a measurement system of a circularly polarized antenna (F-system antenna) experimentally manufactured;

FIG. 26 is a diagram of a test on the axial ratio and input impedance of the on-vehicle windowpane antenna apparatus according to the embodiments of the present invention, showing the measurements of a $P_0$ antenna in relation to Lx2 of the F-system antenna;

FIG. 27 is a diagram showing results of experiments on the axial ratio of F-system antenna 50 in the on-vehicle windowpane antenna apparatus according to the embodiments of the present invention; and FIGS. 28 to 31 are views showing results of experiments on the input impedance of F-system antenna 50 in the on-vehicle windowpane antenna apparatus according to the embodiments of the present invention, and FIGS. 28 and 29 show the experimental results in using a mode of a conductive plate, while FIGS. 30 and 31 illustrate the experimental results in using a model of an automobile (without glass).

DETAILED DESCRIPTION OF THE INVENTION

First Embodiment

Figure 3:
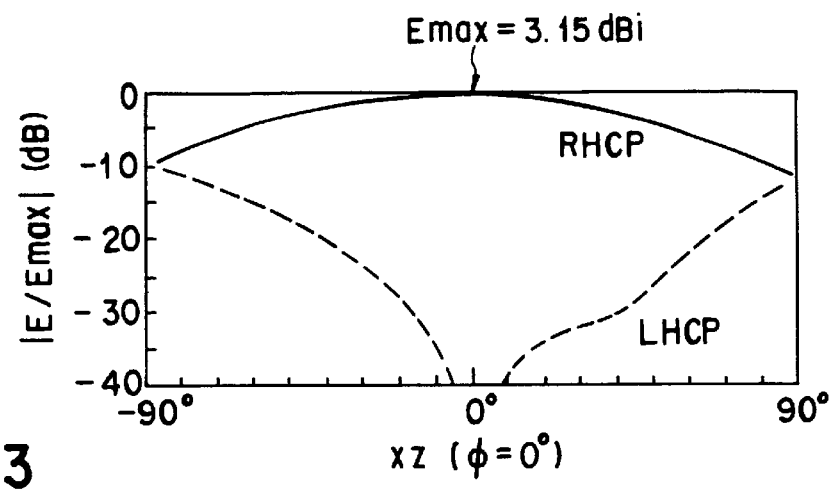
FIGS. 3 and 4 are diagrams of basic characteristics of the $P_0$ antenna of the on-vehicle windowpane antenna apparatus of the first embodiment.

FIGS. 1 and 2 are illustrations of the constitution of an on-vehicle windowpane antenna apparatus according to a first embodiment of the present invention.

In FIG. 1, reference numeral 1 denotes an automobile on which the on-vehicle windowpane antenna apparatus is to be mounted, numeral 2 shows a rear window of the automobile, and numeral 3 indicates a trunk lid thereof. The on-vehicle windowpane antenna apparatus 10 capable of reception of GPS waves is mounted on the rear window 2.

The direction perpendicular to the glass face of the rear window 2, i.e., the antenna face is defined as z-axis Az representing a reference direction of coming waves. The elevation angle between the reference direction (z-axis) and the horizontal plane (ground plane) E is represented as α.

FIG. 2 is a schematic plan view showing a pattern of a basic antenna (hereinafter referred to as a $P_0$ antenna) for receiving GPS waves in the on-vehicle windowpane antenna apparatus 10. As shown in FIG. 2, the $P_0$ antenna includes a right-handed circularly polarized antenna 10A and a power supply section 10B. This antenna 10A mainly includes a loop 13 formed of a long, narrow conductor whose section is circular, and the loop 13 is shaped like a rectangle. The loop 13 has two parallel complex lines 11 and 12 of narrow conductors which correspond to the short (vertical) side (on the right hand of FIG. 2).

Thus, the $P_0$ antenna with the right-handed circularly polarized antenna 10A emits a right-handed circularly polarized wave in a direction perpendicular to the plane on which the loop 13 including the complex lines 11 and 12 is formed.

The loop 13 has four structural parameters of radius a of the conductor of the $P_0$ antenna, horizontal length Lx(Lx1, Lx2), vertical length Ly, and interval b (=Lx1−Lx2) between the complex lines.

The measures of respective components of the antenna 10A are set as follows when the wavelength $f_0$ (1.575 GHz) of the center frequency of GPS wave is $\lambda_0$ (19.05 cm). Neither a feeder, a window frame nor a glass layer is taken into consideration when the measures are set.

Horizontal outside length Lx1=0.3437 $\lambda_0$

Horizontal inside length Lx2=0.2800 $\lambda_0$

Vertical length=0.2219 $\lambda_0$

Radius of conductor=0.0020 $\lambda_0$ (When a strip conductor is used, its width w has to be set to 4a.)

FIGS. 3 to 6 are diagrams of basic characteristics of the $P_0$ antenna provided with the right-handed circularly polarized antenna 10A and power supply section 10B.

More specifically, FIG. 3 shows angular characteristics of the directivity of the antenna on the xz plane (Φ=0°) when the measured frequency f is the center frequency $f_0$. In FIG. 3, a solid line RHCP indicates a right-handed circularly polarized component, while a broken line LHCP represents a left-handed circularly polarized component. As shown, a good right-handed circularly polarized wave is emitted on the z-axis, and the maximum gain of 3.15 dBi is obtained. It is thus seen that the gain of −3 dBi or more can be obtained within a range of angle of ±70°.

Figure 4:
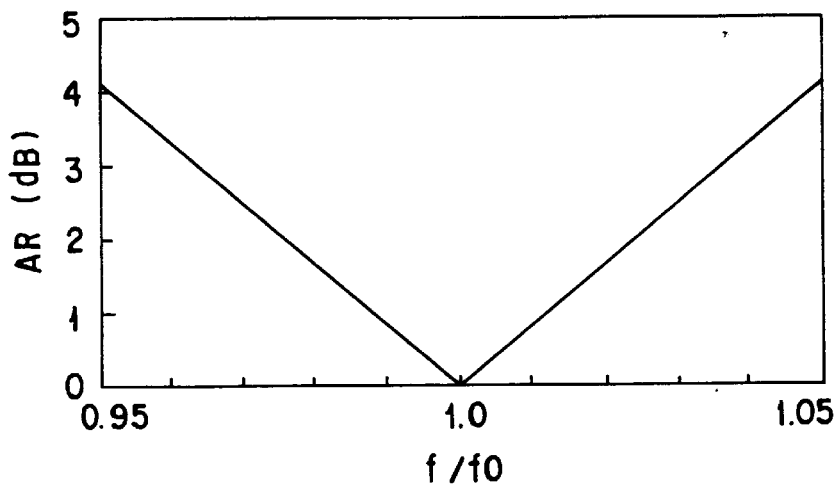

FIG. 4 shows frequency characteristics of the axial ratio. As is apparent therefrom, a good axial ratio of 1 dB or less is obtained within a range of the center frequency $f_0$ of ±1%.

Figure 5:
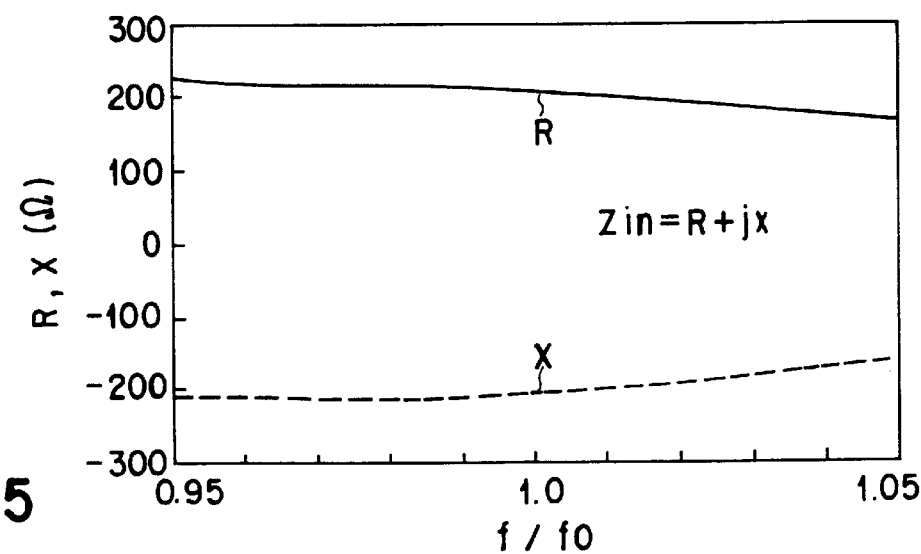
FIGS. 5 and 6 are diagrams of basic characteristics of the $P_0$ antenna of the on-vehicle windowpane antenna apparatus of the first embodiment.
Figure 6:
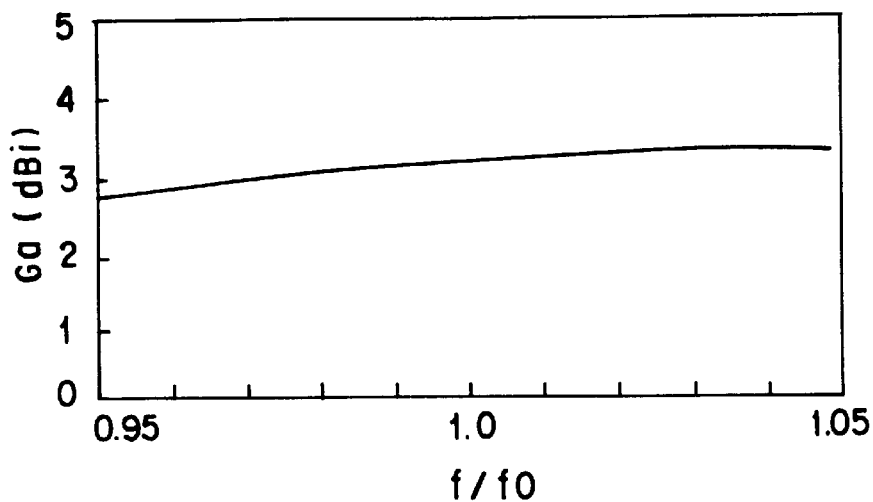

FIG. 5 shows frequency characteristics of input impedance Zin, and FIG. 6 does those of gain Ga. These characteristics are almost constant in the frequency band (±0.67%) in use.

Input impedance Zin=205−j202 Ω

Gain Ga=3.15 dBi

To match the input impedance Zin is not so difficult.

In order to evaluate the characteristics of the on-vehicle windowpane antenna apparatus 10 provided on a dielectric layer of glass, the contraction rate of the antenna, radiation loss due to surface wave, variations in directivity due to the glass layer, etc. have to be taken into consideration. If the thickness d of the dielectric layer (glass layer) is considerably small in relation to the wavelength λ, only the contraction rate 72 s will be at stake. The contraction rate η s is an inverse number of a square root of equivalent dielectric constant ε r. The dielectric constant ε r of the dielectric layer depends upon the thickness d thereof.

Figure 7:
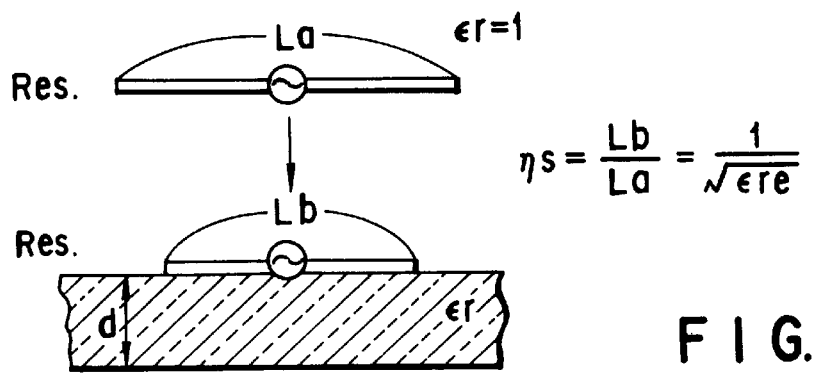
FIGS. 7 and 8 are views of basic characteristics of the $P_0$ antenna of the on-vehicle windowpane antenna apparatus of the first embodiment, in which the contraction rate η s of the antenna depends upon the thickness d of the dielectric layer and the dielectric constant ε r thereof.
Figure 8:
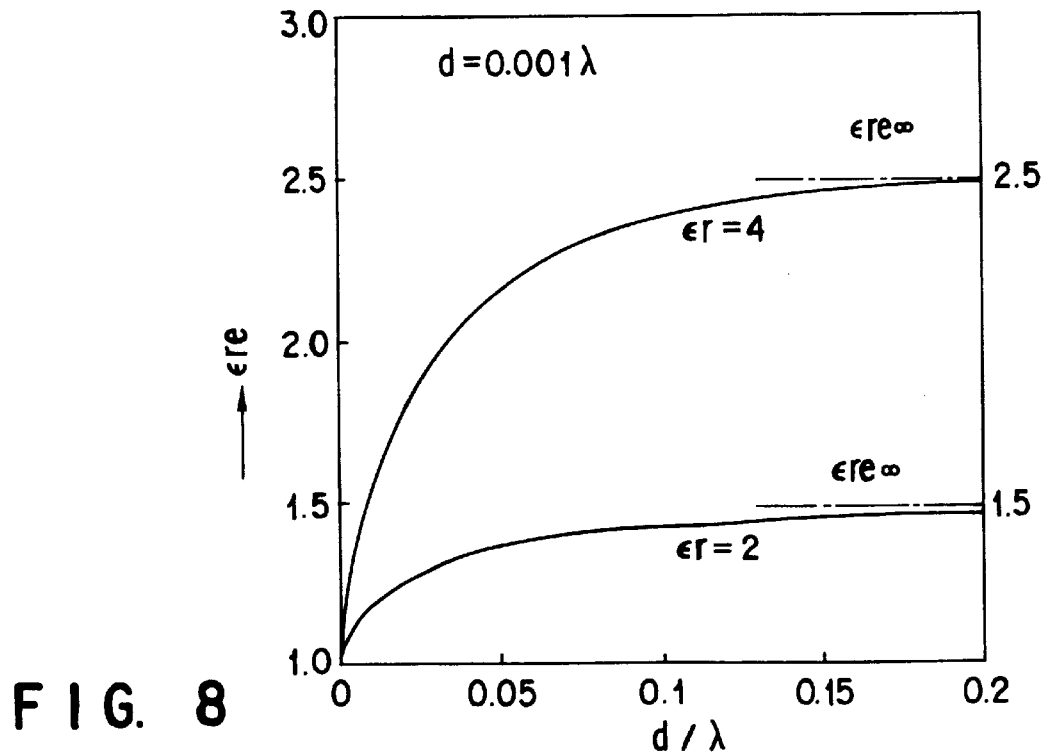

FIGS. 7 and 8 show the dependence of contraction rate 72 s upon thickness d and dielectric constant ε r.

In FIG. 7, Res indicates a radiation resistance. It is apparent from these figures that the contraction rate η s greatly varies as the dielectric constant ε r increases and (thickness d)/(wavelength λ) decreases.

Figure 9:
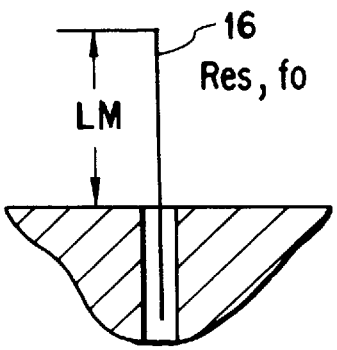
FIGS. 9 to 11 are views showing a method for obtaining the contraction rate η s of the on-vehicle windowpane antenna apparatus of the first embodiment experimentally by resonance.
Figure 10:
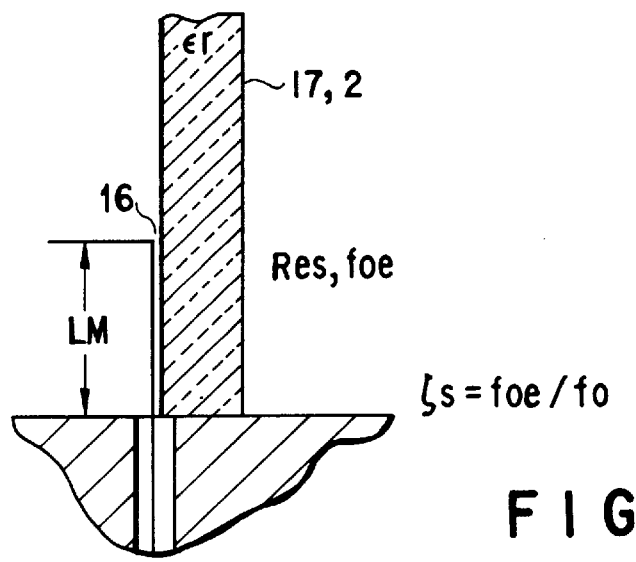

FIGS. 9 and 10 illustrate a method for calculating the contraction rate η s experimentally by resonance. In these figures, too, Res indicates a radiation resistance. This method will be described as follows:

(1) Obtain the resonance frequency $f_0$ of a monopole element 16 having a moderate length LM, as shown in FIG. 9;

(2) Stick the monopole element 16 onto a glass layer 17 corresponding to the rear window 2 to obtain the resonance frequency $f_0e$ thereof, as shown in FIG. 10; and (3) Calculate the contraction rate η s by (4) η s=$f_0e/f_0$.

Figure 11:
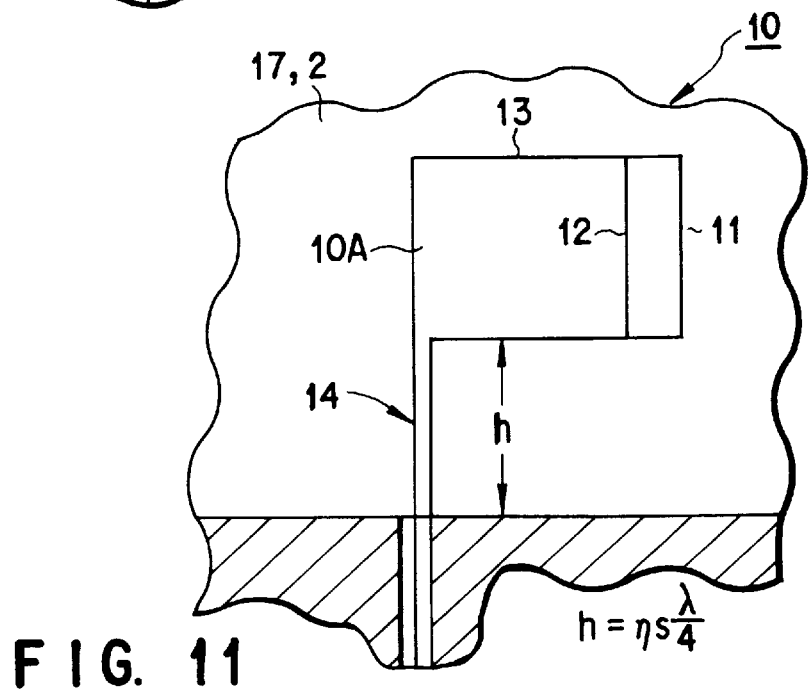

FIG. 11 illustrates the right-handed circularly polarized antenna 10A designed in consideration of the contraction rate η s. This antenna is mounted on a lower part of the rear window 2 of the automobile 1. The height h of the antenna 10A from the lower window frame, which correspond to the length of a power supply line 14, is set to ¼ wavelength of the GPS wave, taking into consideration the contraction rate η s affected by the glass layer 17.

Second Embodiment

Figure 12:
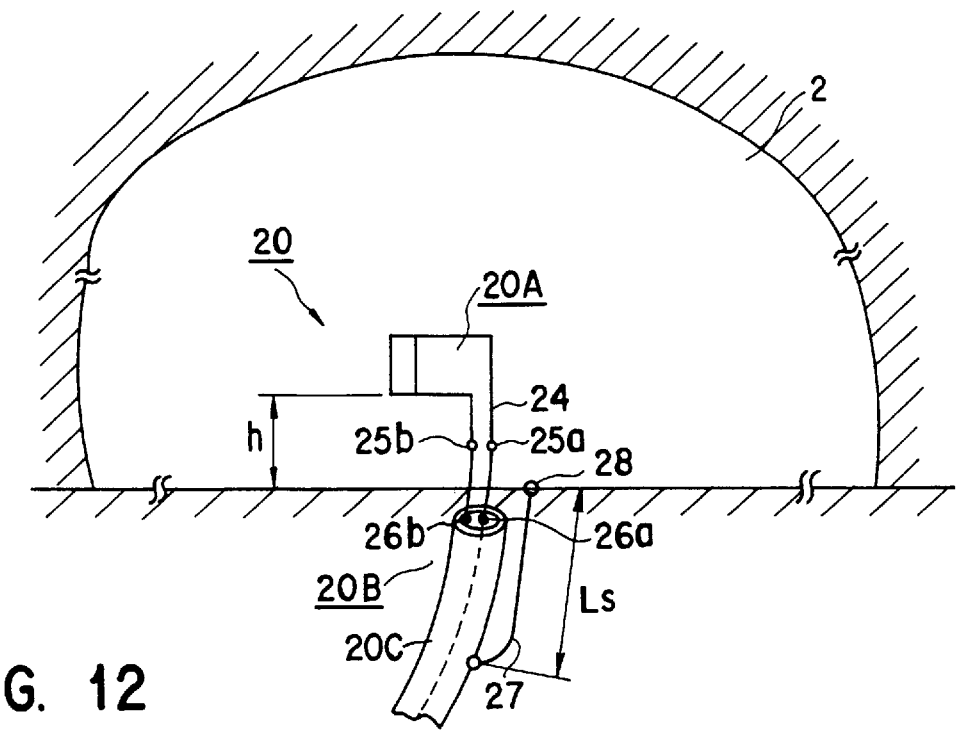
FIGS. 12 and 13 are illustrations of the constitution of an on-vehicle windowpane antenna apparatus according to a second embodiment of the present invention.
Figure 13:
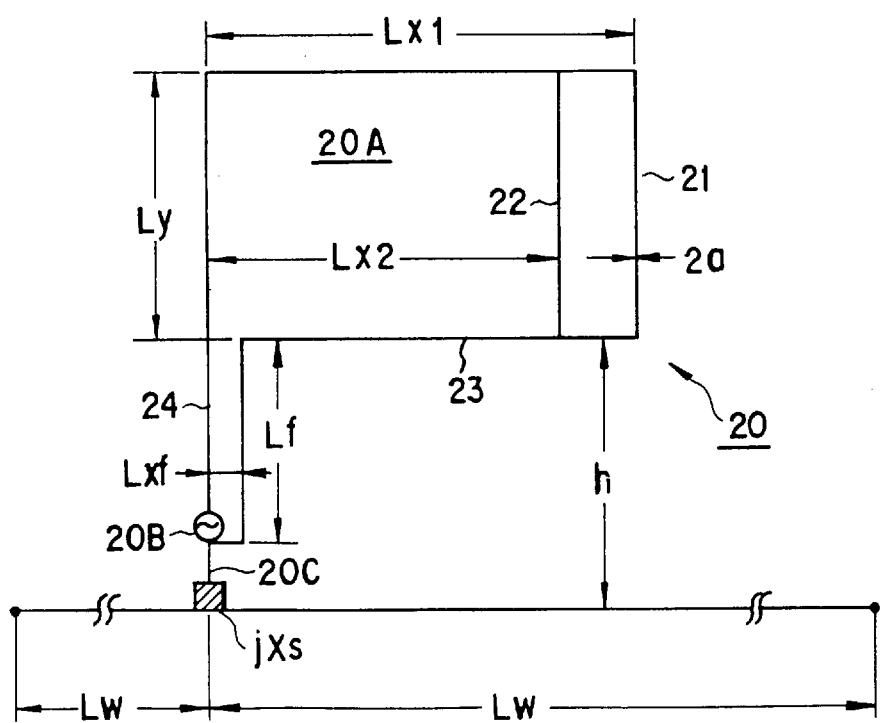

FIGS. 12 and 13 illustrate an on-vehicle windowpane antenna apparatus according to a second embodiment of the present invention. This apparatus includes a right-handed circularly polarized antenna 20A for receiving GPS waves which is designed in view of the constitution of a rear window 2 and a power supply section 20B.

FIG. 12 is a view of the antenna apparatus 20 seen from inside an automobile. The circularly polarized antenna 20A has a power supply line 24. The power supply line 24 is constituted of parallel two lines directly printed on the glass face of the rear window 2. Power supply terminals 25a and 25b are provided at end portions of the power supply line 24. The terminal 25a is connected to the central conductor 26a of a coaxial cable 20C, while the terminal 25b is connected to an external conductor 26b thereof. The external conductor 26b is connected to an earth terminal 28 by a lead 27 having a length Ls.

FIG. 13 shows an equivalent circuit for the antenna apparatus 20. The construction of the circularly polarized antenna 20A is substantially the same as that of the antenna 10A of the $P_0$ antenna of the first embodiment. The circularly polarized antenna 20A has the following measures calculated by the moment analysis of a linear antenna:

Horizontal outside length Lx1=0.3437 λ=4.413 cm

Horizontal inside length Lx2=0.2800 λ=3.595 cm

Vertical length=0.2219 λ=2.849 cm

Radius of conductor=0.0020 λ=0.257 mm

Here λ is an equivalent wavelength of the center frequency $f_0$ and, if the contraction rate η is estimated to be 0.67, λ=ηλ$_0$=12.84 cm.

The on-vehicle windowpane antenna apparatus 20 of the second embodiment is an F-system (Feeder system) antenna in which a power supply line 24 of two parallel lines having a length of Lf and a width of Lxf is provided at one end of the circularly polarized antenna 20A, and a coaxial cable 20C is connected to the power supply line 24. The difference between the height h of the antenna 20A from the window frame and the length Lf of the power supply line 24 corresponds to the length of the coaxial cable 20C.

In FIG. 13, Lw indicates the length of a conductor designed in view of the window frame near the antenna. A reactance jXs formed by the conductor of length Ls is provided at the connection between the window frame and coaxial cable 20C.

Third Embodiment

FIGS. 14 to 22 are diagrams of an on-vehicle windowpane antenna apparatus 30 according to a third embodiment of the present invention. This apparatus 30 includes a GPS wave receiving F-system antenna designed in view of a rear window 2.

There are nine parameters for designing the antenna in all. Of these parameters, horizontal outside length Lx1, horizontal inside length Lx2 and vertical length Ly are variable parameters, and the others are fixed as follows.

h=0.1 λ, Lf=0.09 λ, Lxf=0.01 λ, Lw=1.0 λ,

Xs=0.0, a=0.002 λ

The above fixed parameters imply that the antenna has a natural structure wherein the height of the antenna from the window frame is somewhat decreased as compared with the wavelength and the width of the power supply line is five times as long as the radius of a conductor. The antenna is not provided with a reactance but grounded at the base portion of a coaxial cable. Varying the three parameters Lx1, Lx2 and Ly to obtain the antenna structure capable of emitting a right-handed circularly polarized wave on the z-axis, one degree of freedom was found. Therefore, by determining a value of Ly and then adjusting Lx1 and Lx2, a circularly polarized antenna was achieved.

FIGS. 14 to 22 show examples of structures of the F-system antenna and their characteristics in cases where Ly is 0.14 λ, 0.18 λ, 0.22 λ, and 0.26 λ.

Figure 14:
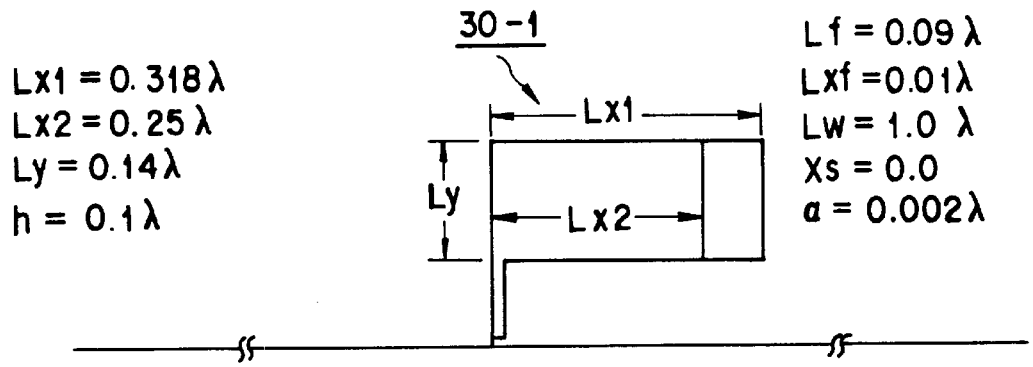
FIGS. 14 to 16 are illustrations of the constitution of an on-vehicle windowpane antenna apparatus according to a third embodiment of the present invention and, more specifically.
Figure 15:
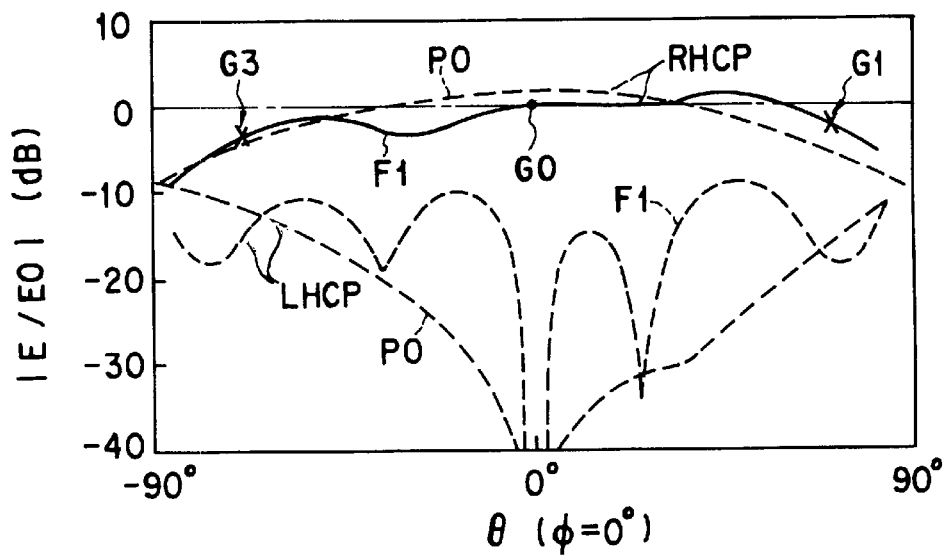
Figure 16:
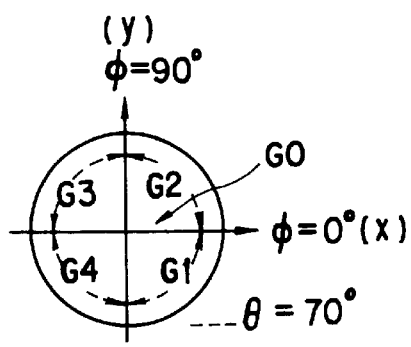

FIGS. 14 to 16 are views of the structure of a circularly polarized antenna (F1 antenna) 30-1 and its characteristics when Ly is 0.14 λ. Comparing the measure of the F1 antenna of FIG. 14 with that of the $P_0$ antenna of FIG. 1, the vertical length Ly is shorter and the horizontal outside length Lx1 and horizontal inside length Lx2 are longer; however, the F1 antenna has no trouble in practical use.

FIG. 15 shows the directivity of the antenna on an xz plane (Φ=0° ). For comparison, the directivity of the $P_0$ antenna is plotted in FIG. 15. Roughly judging from FIG. 15, it is seen that the RHCP slightly varies with θ and is close to the directivity of the $P_0$ antenna. When θ=0°, the gain $G_0$ is 1.61 dBi and lower than that (3.15 dBi) of the $P_0$ antenna by 1.5 dBi. However when θ=±65°, the gain of the F1 antenna is higher than that of the $P_0$ antenna. This can be considered to be good characteristics as wide-angle characteristics of the gain.

FIG. 16 shows gains G1 to F4 in order to check the wide-angle characteristics on a θ plane. These gains are obtained in cases where θ is 0°, 90°, 180° and 270° when θ=70°. It is seen that each of the gains has only to be −3dBi or higher as a standard for designing the antenna.

It is apparent from FIG. 15 that the directivity of the antenna on the y-axis is slightly poor since G2 is −3.96 dBi and also that the LHCP, which is a crossed polarized wave, is considerably inferior to the $P_0$ antenna, and its gain is −10 dBi or lower and there is a difference of about 10 dBi between the LHCP and RHCP of the main polarized wave over a wide angle of θ. This difference is called crossed polarized wave identification XPD. If XPD is 10 dBi, the axial ratio AR is about 2 (=dBi), the wave of the antenna can be regarded as a circularly polarized wave.

Since the input impedance Zin is 39−j156 (Ω), the resistance is slightly lower than 50 Ω, and the capacitive reactance is about 150 Ω. These values can be matched by connecting coils in series.

The F1 antenna shown in FIGS. 14 to 16 is not therefore inferior to the $P_0$ antenna in either structure or characteristics.

Figure 17:
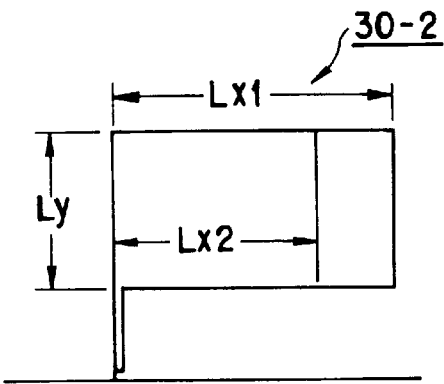
FIGS. 17 and 18 are illustrations of the constitution of the on-vehicle windowpane antenna apparatus of the third embodiment of the present invention and, more specifically.
Figure 18:
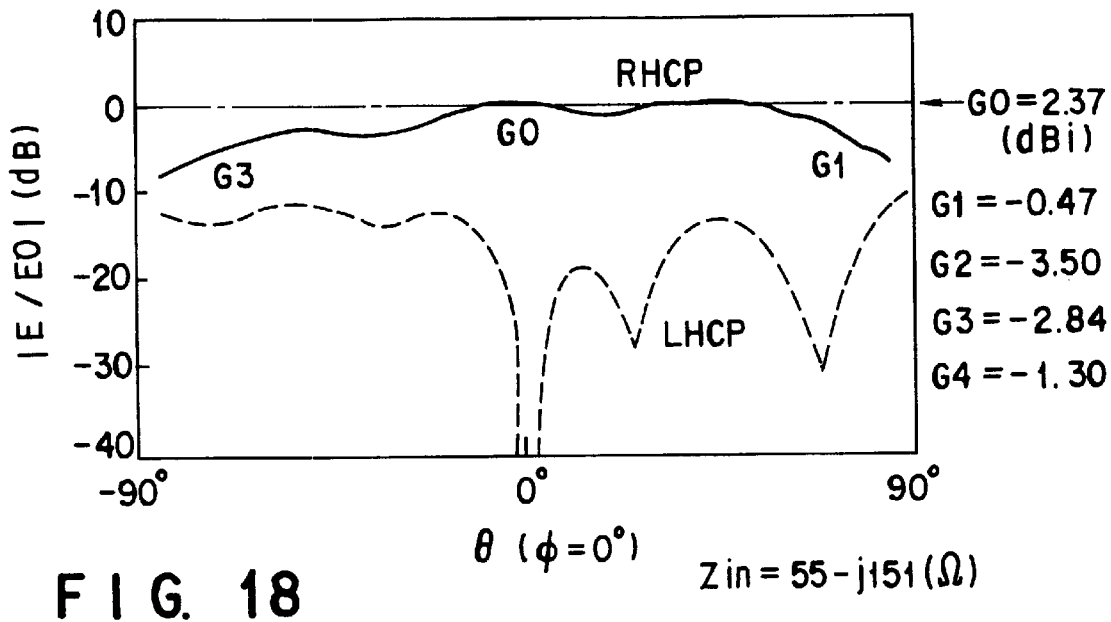

FIGS. 17 and 18 are views of the structure of a circularly polarized antenna (F2 antenna) 30-2 and its characteristics when Ly is 0.18 λ. Comparing it with of the foregoing F1 antenna, Ly is slightly increased and accordingly Lx1 is increased and Lx2 is decreased. Therefore, the F2 antenna does not appear to be so rectangular, as shown in FIG. 17. As is seen from the directivity shown in FIG. 18, the gain $G_0$ on the z-axis is 2.37 dBi and thus higher than that in the F1 antenna by about 0.7 dBi. The wide-angle characteristic is somewhat improved when G2=−3.5 dBi. The crossed polarized wave identification XPD is degraded when θ<0° and improved when θ>0°. The input impedance Zin is 55−j151 (Ω). The resistance increases and approaches 50 Ω, whereas the reactance hardly varies.

Figure 19:
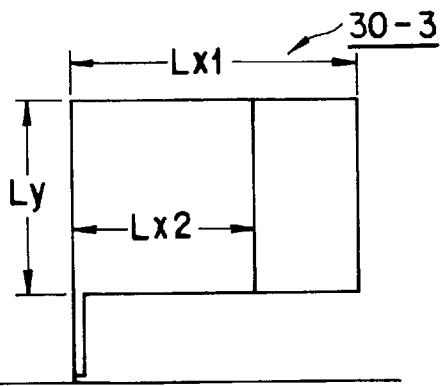
FIGS. 19 and 20 are illustrations of the constitution of the on-vehicle windowpane antenna apparatus of the third embodiment of the present invention and, more specifically.
Figure 20:
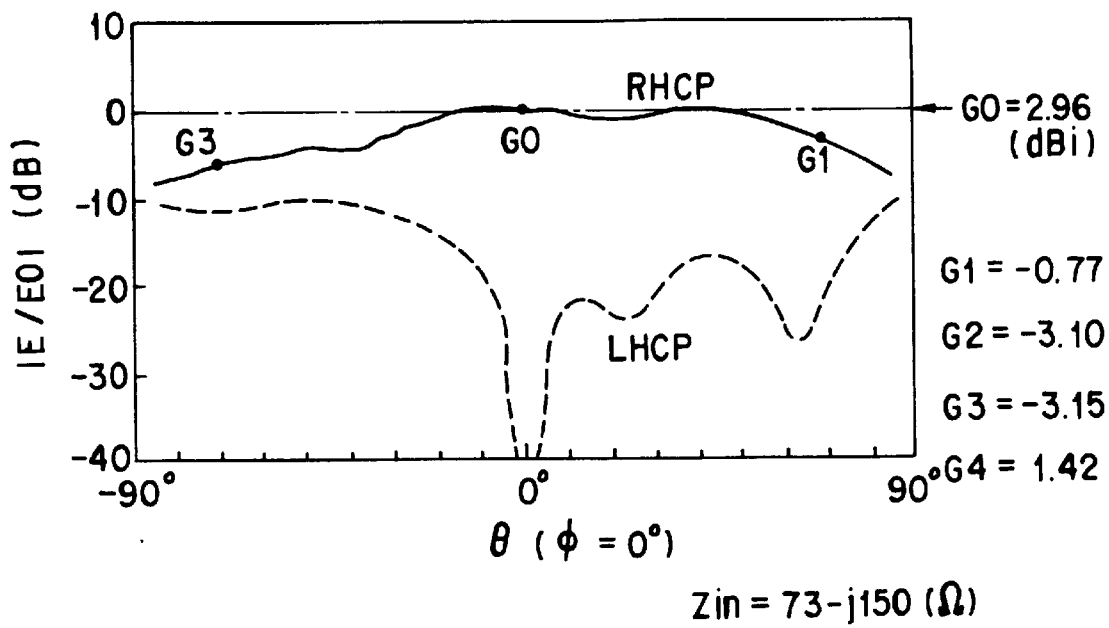
Figure 21:
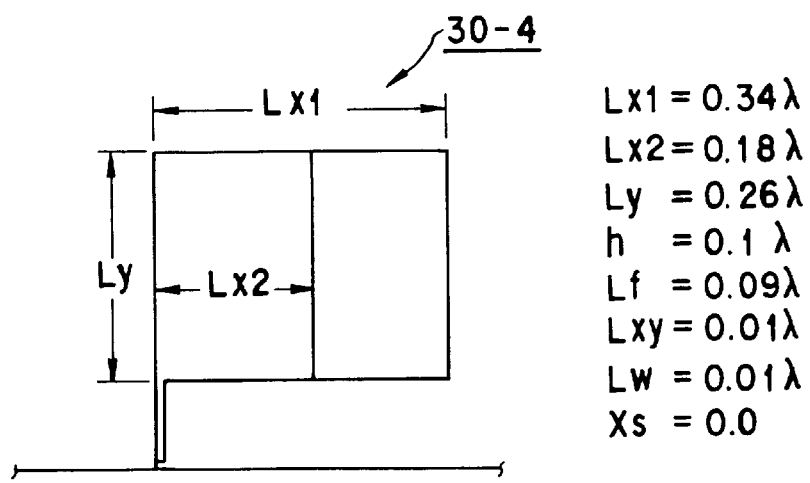
FIGS. 21 and 22 are illustrations of the constitution of the on-vehicle windowpane antenna apparatus of the third embodiment of the present invention and, more specifically.
Figure 22:
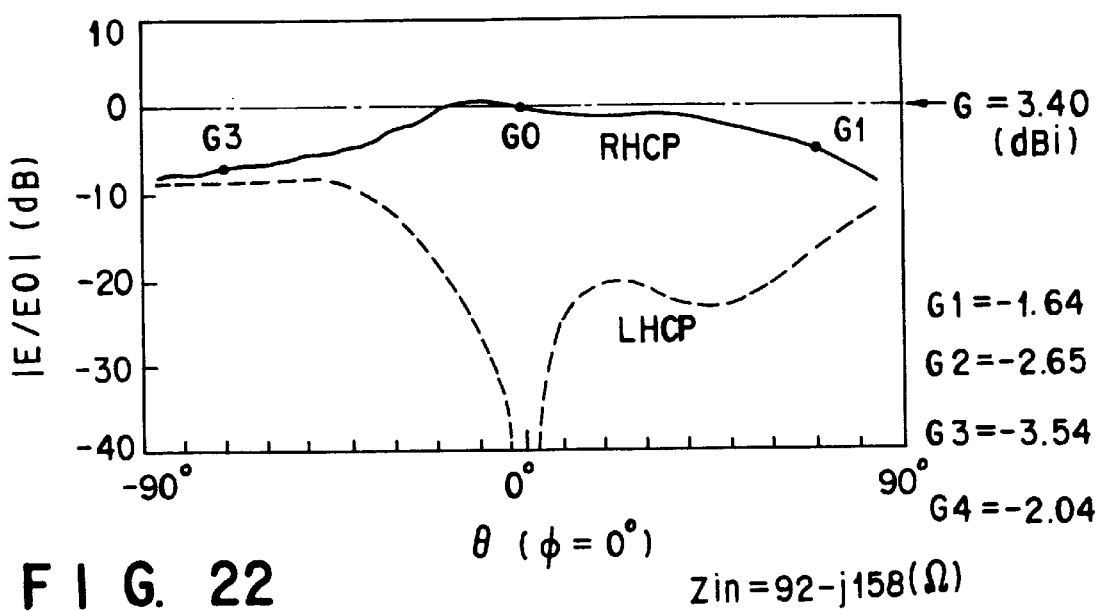

FIGS. 19 and 20 are views of the structure of a circularly polarized antenna (F3 antenna) 30-3 and its characteristics when Ly is 0.22 λ. FIGS. 21 and 22 are views of the structure of a circularly polarized antenna (F4 antenna) 30-4 and its characteristics when Ly is 0.26 λ.

As illustrated in FIGS. 19, 20, 21 and 22, as the vertical length Ly increases further, the tendency described referring to FIGS. 17 and 18 is maintained.

The features of the F-system antennas of different vertical lengths Ly are summarized as follows:

(1) The circularly polarized antenna can reliably be achieved by adjusting two values of Lx1 and Lx2 with respect to an arbitrary value of Ly.
(2) The constitution of the antenna is varied such that both Ly+Lx2 and Lx1 are almost fixed even though Ly changes.
(3) The gain on the z-axis increases if Ly does.
(4) It is when Ly is about 0.22 λ that the antenna has the best wide-angle gain characteristics.
(5) It is when Ly is about 0.18 λ that the input impedance is close to 50 Ω.
(6) It is when Ly is about 0.14 λ that the best wide-angle characteristics of crossed polarized wave identification XPD are obtained.
(7) It is when Ly is about 0.22 λ that the antenna has a favorable outward appearance. In this case, Ly is equal to about Lx2, Ly+h is equal to about Lx1, and Ly/Lx1 is ⅔.
(8) If reception is prioritized, the wide-angle characteristics of the main polarized wave is considered to be the most important and then XPD has only to be taken into consideration.

Fourth Embodiment

Figure 23:
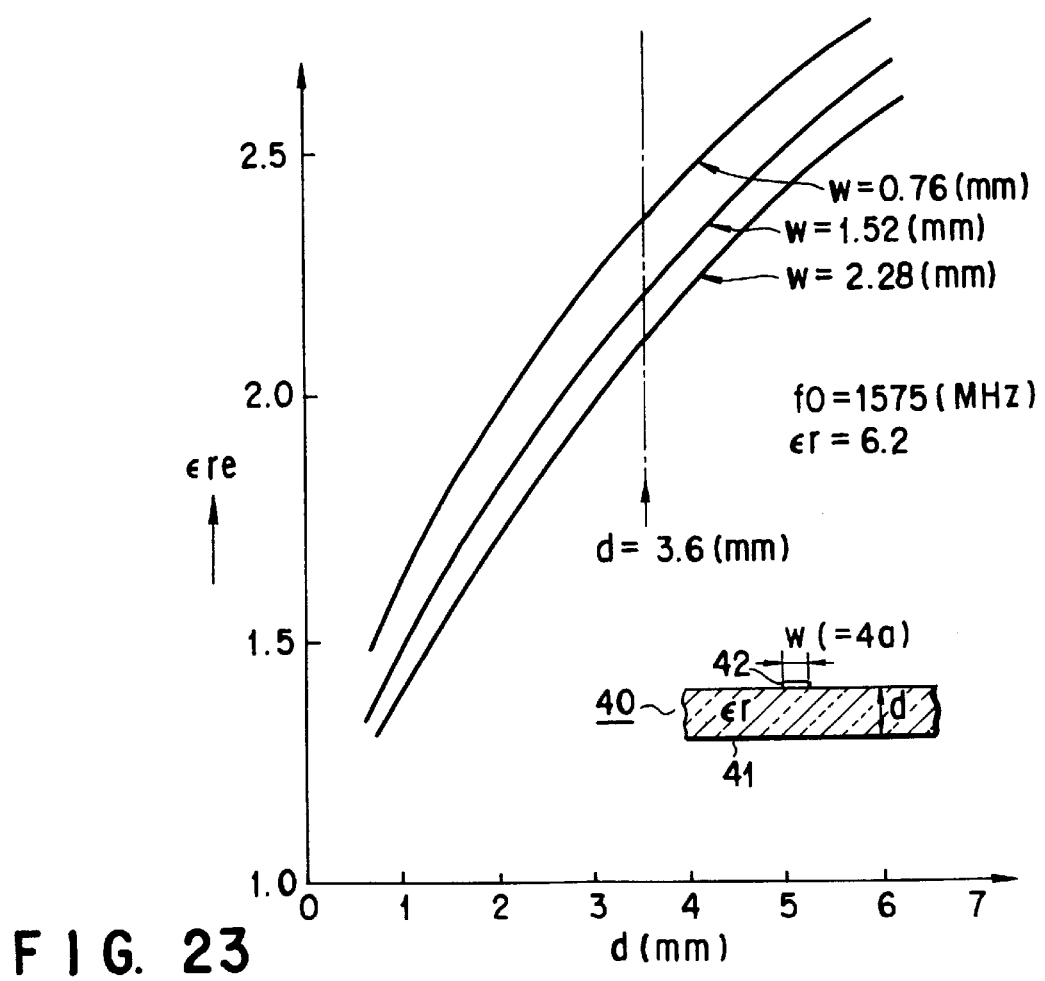
FIG. 23 is a graph showing the constitution and characteristics (equivalent dielectric constant) of an on-vehicle windowpane antenna apparatus of a fourth embodiment of the present invention.

FIG. 23 is a graph showing the constitution and characteristics of an on-vehicle windowpane antenna apparatus 40 according to a fourth embodiment of the present invention. In this apparatus 40, a strip conductor 42 having a width w of 4a is formed on a glass layer 41. First, an equivalent dielectric constant ε r of the strip conductor 42 is obtained from electrostatic approximation. Since the thickness d of the glass layer 41 is considerably small in relation to the wavelength λ, the equivalent dielectric constant ε r approaches "1" and therefore the sensitivity of the equivalent dielectric constant ε r to the thickness d of the glass layer 41 is high.

In the case of the glass of a rear window 2 of an automobile 1 according to the fourth embodiment, the equivalent dielectric constant ε r is 6.2, and the thickness d of the glass layer 41 is 3.6 mm. When the idth w of the strip conductor 42 is 1.52 mm, the equivalent dielectric constant ε r is 2.2. Therefore, as described above, the contraction rate η s is 0.67.

The equivalent dielectric constant ε r is somewhat varied with the width w of the strip conductor and, if the thickness d of the glass layer 41 increases, the equivalent dielectric constant ε r tends to decrease.

Experimental Results

FIGS. 24 to 31 are illustrations of a test on the axial ratio and input impedance of the on-vehicle windowpane antenna apparatus according to the foregoing embodiments of the present invention.

FIG. 24 shows an automobile 1, a GPS incoming wave, a circularly polarized antenna 50, and a reference coordinate of the directivity of the antenna. The direction perpendicular to the glass face of the rear window 2 is defined as z-axis Az of the reference coordinate, and the z-axis Az is regarded as a reference direction of the incoming wave. It is a trunk lid 3 that has the greatest influence upon the directivity of the antenna. If the trunk lid 3 is parallel with the ground plane E, the elevation angle α of a reference incoming wave corresponds to that formed between the z-axis Az and the upper surface of the trunk lid 3.

FIG. 25 shows a circularly polarized antenna 50 experimentally manufactured, that is, a measurement system of an F-system antenna designed in view of a feeder 51 and a conductor plate 52 corresponding to a runk lid 3. The circularly polarized antenna 50 serves as a transmission one, and a dipole antenna 53, which is opposed thereto with an interval R therebetween, serves as a reception one. The conductor plate 52 measures one meter by two meters, and is arranged at an angle a to the z-axis Az connecting the transmission and reception antennas 50 and 53. The transmission antenna 50 is connected to a network analyzer 60 via the feeder 51, while the reception antenna 53 is connected thereto via another feeder 54.

FIG. 26 is a diagram showing the measure of the $P_0$ antenna 70 with respect to Lx2 of the F-system antenna 50. The antenna 70 is equivalent for the antenna 50 from which the feeder 51 and conductor plate 52 are excluded, and so designed as to provide the initial structure of the F-system antenna 50.

To aim at making Lx2 substantially equal to Ly, Lx2 is set to about 0.25; accordingly, Lx1 and Ly are set to 0.34 and 0.265, respectively. This is the initial structure of the F-system antenna.

Using a measurement system of the F-system antenna so constituted, a reception antenna 53 receives horizontal and vertical polarized waves from a transmission antenna 50, and the axial ratio of the F-system antenna is calculated from the amplitudes and phases of the waves.

FIG. 27 is a diagram showing experimental values EX of the axial ratio of the F-system antenna 50 obtained from the above experiment, together with theoretical values TH of the $P_0$ antenna. In this case, α=58° and α=0.4 mm. The elevation angle α is calculated from the measure of a model of an automobile and slightly differs from that of the actual one. Lx1 and Ly are adjusted such that the axial ratio on the z-axis is minimized at a wavelength of 1.575 GHz.

According to the experiment, when Lx1 is 0.316 λ=6.0 cm, Ly is 0.258 λ=4.9 cm, and Lx2 is about 0.24 λ=4.55 cm, the axial ratio of 3 dB or less is obtained at a wavelength of 1.575 GHz and that of 1 dB or less-is done at a wavelength of 1.59 GHz as the experimental values EX, as shown in FIG. 27. It is thus understood that the minimum axial ratio can be obtained at a wavelength of 1.575 GHz if the entire antenna is increased in scale by about one percent. Comparing the axial ratio with the theoretical values of the $P_0$ antenna, the bandwidth tends to be about ⅓ times narrower than that of the $P_0$ antenna.

FIGS. 28 to 31 are illustrations of results of experiments on the input impedance of the F-system antenna 50. FIGS. 28 and 29 show the experimental results in using a model of a conductive plate, while FIGS. 30 and 31 illustrate those in using a model of an automobile (without a glass). As shown in these figures, the real part of the input impedance is about 100 Ω, but the imaginary parts vary from grounded state. In the case of the automobile model shown in FIGS. 30 and 31, the imaginary part is approximately zero.

From the above experiments, it has theoretically turned out that the on-vehicle windowpane antenna apparatus can reliably be achieved as a circularly polarized antenna.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A windowpane antenna apparatus for use in vehicles, comprising:

a rectangular loop formed of a first long and narrow conductor and mounted on a windowpane of a vehicle such that a longer axis extends in a horizontal direction, the rectangular loop having a pair of long sides opposite to each other and a pair of short sides opposite to each other so as to form a single rectangular closed loop having four corner sections;

a power supply section provided at one of lower corner sections of the four corner sections;

a composite line formed of a second long and narrow conductor arranged close and parallel to one of the short sides of the rectangular loop, which is located farther away from the power supply section; and means for operating the rectangular loop including the composite line as a circularly polarized antenna which emits a circularly polarized wave in a direction perpendicular to a plane where the rectangular loop is formed and which receives a GPS wave, wherein each of the short sides of the rectangular loop has a length Ly ranging from $0.14\lambda$ to $0.22\lambda$ and the rectangular loop is arranged and located at a height h of $\lambda/4$ above a lower side of a window frame when $\lambda$ represents a wavelength of a center frequency of the GPS wave.

2. The apparatus according to claim 1, wherein the circularly polarized wave is a right-handed circularly polarized wave.

\* \* \* \* \*